US008326849B2

(12) United States Patent
El Emam et al.

(10) Patent No.: US 8,326,849 B2
(45) Date of Patent: Dec. 4, 2012

(54) SYSTEM AND METHOD FOR OPTIMIZING THE DE-IDENTIFICATION OF DATA SETS (75) Inventors: Khaled El Emam, Ottawa (CA); Romeo Issa, Ottawa (CA); Fida Dankar, Ottawa (CA)

(73) Assignee: University of Ottawa, Ottawa, Ontario (CA)

( * ) Notice: Subject to any disclaimer, the term of this patent is extended or adjusted under 35 U.S.C. 154(b) by 127 days.

(21) Appl. No.: 12/692,473

(22) Filed: Jan. 22, 2010

(65) Prior Publication Data

US 2010/0332537 A1 Dec. 30, 2010

Related U.S. Application Data (60) Provisional application No. 61/220,429, filed on Jun. 25, 2009.

(51) Int. Cl.
*G06F 7/00* (2006.01)
*G06F 17/30* (2006.01)

(52) U.S. Cl. .......................... 707/756; 707/771
(58) Field of Classification Search .......... 707/771, 707/756
See application file for complete search history.

(56) References Cited

U.S. PATENT DOCUMENTS

| 6,397,224 | B1 * | 5/2002 | Zubeldia et al. ...... 707/999.101 |
| 6,732,113 | B1 * | 5/2004 | Ober et al. ............. 707/999.01 |
| 6,734,886 | B1 * | 5/2004 | Hagan et al. .................. 715/853 |
| 6,941,463 | B1 * | 9/2005 | Atallah et al. ................. 713/190 |
| 7,158,979 | B2 * | 1/2007 | Iverson et al. ................. 707/741 |
| 7,269,578 | B2 * | 9/2007 | Sweeney ........................ 705/74 |
| 7,376,677 | B2 * | 5/2008 | Ober et al. ................. 707/999.1 |
| 7,475,085 | B2 * | 1/2009 | Aggarwal et al. ...... 707/999.002 |
| 7,519,591 | B2 * | 4/2009 | Landi et al. ............. 707/999.006 |
| 7,823,207 | B2 * | 10/2010 | Evenhaim ........................ 726/26 |
| 2004/0199781 | A1 * | 10/2004 | Erickson et al. .............. 713/200 |
| 2007/0192139 | A1 * | 8/2007 | Cookson et al. .................. 705/3 |

OTHER PUBLICATIONS

LeFevre et al "Incognito: Efficient Full-Domain K-Anonymity", Published in 2005 in "Proceedings of the 2005 ACM SIGMOD international conference on Management of data", pp. 49-60.*
Emam et al. "A Globally Optimal k-Anonymity Method for the De-Identification of Health Data" , Sep./Oct. 2009, Journal of the American Medical Informatics Association, vol. 16 No. 5, pp. 670-682.*
Samarati et al. "Protecting Privacy when Disclosing Information: k-Anonymity and its Enforcement through Generalization and Suppression". 1998, Technical Report SRI-CSL-98-04, pp. 1-19.*
Bayardo et al. "Data Privacy Through Optimal k-Anonymization", 2005, Proceedings of the 21st International Conference on Data Engineering, pp. 1-12.*
Bradley Malin, "Protecting DNA Sequence Anonymity with Generalization Lattices" Oct. 2004, CMU-ISRI-04-134, pp. 1-11.*
Terrovitis et al., "Privacy preserving Anonymization of Set valued Data", Aug. 23-28, 2008, PVLDB '08, pp. 115-125.*

(Continued)

*Primary Examiner* — James Trujillo
*Assistant Examiner* — Pavan Mamillapalli
(74) *Attorney, Agent, or Firm* — Garvey, Smith, Nehrbass & North, L.L.C.; Brett A. North (57) ABSTRACT

A method, system and computer memory for optimally de-identifying a dataset is provided. The dataset from a storage device. The equivalence classes within the dataset is determined. A lattice is determined defining anonymization strategies. A solution set for the lattice is generated. Optimal node from the solution set is determined. The dataset is then de-identified using the generalization defined by the optimal node and can then be stored on the storage device.

20 Claims, 9 Drawing Sheets

OTHER PUBLICATIONS

Kisilevich et al., "Efficient Multidimensional Suppression for K-Anonymity", Apr. 15, 2009, IEEE Transactions on Knowledge and Data Engineering, vol. 22, No. 3, pp. 334-347.*

Li et al, "Achieving k-Anonymity by Clustering in Attribute Hierarchical Structures", 2006, A Min Tjoa and J. Trujillo, DaWak 2006, LNCS 4081, pp. 405-416.*

* cited by examiner

SYSTEM AND METHOD FOR OPTIMIZING THE DE-IDENTIFICATION OF DATA SETS

CROSS-REFERENCE TO RELATED APPLICATIONS

This Application claims the benefit of U.S. Patent Application No. 61/220,429 file Jun. 25, 2009 which is hereby incorporated by reference.

TECHNICAL FIELD

The present disclosure relates to databases and particularly to protecting privacy by de-identification of personal data stored in the databases.

BACKGROUND

Personal information is being continuously captured in a multitude of electronic databases. Details about health, financial status and buying habits are stored in databases managed by public and private sector organizations. These databases contain information about millions of people, which can provide valuable research, epidemiologic and business insight. For example, examining a drugstore chain's prescriptions or over the counter drug sales can indicate where a flu outbreak is occurring. To extract or maximize the value contained in these databases, data custodians must often provide outside organizations access to their data. In order to protect the privacy of the people whose data is being analyzed, a data custodian will "de-identify" information before releasing it to a third-party. De-identification ensures that data cannot be traced to the person about whom it pertains.

In addition, there have been strong concerns about the negative impact of explicit consent requirements in privacy legislation on the ability to conduct health research. Such concerns are re-enforced by the compelling evidence that requiring opt-in for participation in different forms of health research can negatively impact the process and outcomes of the research itself: a) recruitment rates decline significantly when individuals are asked to consent (opt-in vs. opt-out consent, or opt-in vs. waiver of consent or no consent), (b) those who consent tend to be different from those who decline consent on a plethora of variables (age, sex, race/ethnicity, marital status, rural versus urban locations, education level, socio-economic status and employment, physical and mental functioning, language, religiosity, lifestyle factors, level of social support, and health/disease factors such as diagnosis, disease stage/severity, and mortality) hence potentially introducing bias in the results, (c) consent requirements increase the cost of conducting the research and often these additional costs are not covered, and (d) the research projects take a longer time to complete (because of the additional time and effort needed to obtain consent, as well as taking longer to reach recruitment targets due to the impact on recruitment rates).

When de-identifying records, many people assume that removing names and addresses (direct identifiers) is sufficient to protect the privacy of the persons whose data is being released. The problem of de-identification involves those personal details that are not obviously identifying. These personal details, known as quasi-identifiers, include the person's age, sex, postal code, profession, ethnic origin and income (to name a few).

Data de-identification is currently a manual process. Heuristics are used to make a best guess how to remove identifying information prior to releasing data. Manual data de-identification has resulted in several cases where individuals have been re-identified in supposedly anonymous datasets. One popular anonymization criterion is k-anonymity. There have been no evaluations of the actual re-identification probability of k-anonymized data sets and datasets are being released to the public without a full understanding the vulnerability of the dataset.

Accordingly, systems and methods that enable improved database de-identification are required.

SUMMARY

A method, system and computer memory for optimally de-identifying a dataset is provided. The dataset is retrieved from a storage device. The equivalence classes within the dataset are determined. A lattice is determined defining anonymization strategies. A solution set for the lattice is generated. Optimal node from the solution set is determined. The dataset is then de-identified using the generalization defined by the optimal node and can then be stored on the storage device.

In an aspect of the present disclosure there is provided A method of de-identifying a dataset containing personal data records to minimize data loss on a computing device comprising a memory and a processor. The processor performing the method comprising: retrieving the dataset from a storage device; determining equivalence classes for one or more quasi-identifiers defined within the dataset, the equivalence classes based upon ranges of values associated with each quasi-identifier; generating a lattice comprising a plurality of nodes, each node of the lattice defining an anonymization strategy by equivalence class generalization of one or more quasi-identifiers and an associated record suppression value; generating a solution set for the lattice of nodes providing k-anonymity and the least amount of generalization and record suppression of the dataset; and determining one or more optimal nodes from the solution set providing the least amount of generalization and suppression of one or more records of the dataset.

In an aspect of the present disclosure there is provided a system for optimally de-identifying a dataset. The system comprising: a memory for storing instructions; a storage device for storing the dataset; a processor for executing instructions. The instructions performing the method comprising: retrieving the dataset from a storage device; determining equivalence classes for one or more quasi-identifiers defined within the dataset, the equivalence classes based upon ranges of values associated with each quasi-identifier; generating a lattice comprising a plurality of nodes, each node of the lattice defining an anonymization strategy by equivalence class generalization of one or more quasi-identifiers and an associated record suppression value; generating a solution set for the lattice of nodes providing k-anonymity and the least amount of generalization and record suppression of the dataset; and determining one or more optimal nodes from the solution set providing the least amount of generalization and suppression of one or more records of the dataset.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-10.

When datasets are released containing personal information, potential identification information is removed to minimize the possibility of re-identification of the information. However there is a fine balance between removing information that may potentially lead to identification of the personal data stored in the database versus the value of the database itself. A commonly used de-identification criterion is k-anonymity, and many k-anonymity methods have been developed. With k-anonymity, an original data set containing personal information can be transformed so that it is difficult to determine the identity of the individuals in that data set. A k-anonymized data set has the property that each record is similar to at least another k−1 other records on the potentially identifying variables. For example, if k=5 and the potentially identifying variables are age and gender, then a k-anonymized data set has at least 5 records for each value combination of age and gender. The most common implementations of k-anonymity use transformation techniques such as generalization, global recoding, and suppression.

Any record in a k-anonymized data set has a maximum probability 1/k of being re-identified. In practice, a data custodian would select a value of k commensurate with the re-identification probability they are willing to tolerate—a threshold risk. Higher values of k imply a lower probability of re-identification, but also more distortion to the data, and hence greater information loss due to k-anonymization. In general, excessive anonymization can make the disclosed data less useful to the recipients because some analysis becomes impossible or the analysis produces biased and incorrect results.

Ideally, the actual re-identification probability of a k-anonymized data set would be close to 1/k since that balances the data custodian's risk tolerance with the extent of distortion that is introduced due to k-anonymization. However, if the actual probability is much lower than 1/k then k-anonymity may be over-protective, and hence results in unnecessarily excessive distortions to the data.

A new de-identification method is provided that satisfies the k-anonymity criterion and that is suitable for health data sets. For the de-identification of health data sets, the proposed method is an improvement on existing k-anonymity techniques in terms of information loss and performance.

The variables that are going to be de-identified in a data set are called the quasi-identifiers. Examples of common quasi-identifiers are: dates (such as, birth, death, admission, discharge, visit, and specimen collection), locations (such as, postal codes or zip codes, hospital names, and regions), race, ethnicity, languages spoken, aboriginal status, and gender.

All the records that have the same values on the quasi-identifiers are called an equivalence class. For example, all records in data set for 17 year old males admitted on 1 Jan. 2008 are an equivalence class. Equivalence class sizes potentially change during de-identification. For example, there may be 3 records for 17 year old males admitted on 1 Jan. 2008. When the age is recoded to a five year interval, then there may be 8 records for males between 16 and 20 years old admitted on 1 Jan. 2008.

A de-identification method balances the probability of re-identification with the amount of distortion to the data. Several solutions have been discussed in the literature to address this problem and these generally have two steps. The first step consists of defining suitable measures for the de-identified data, one representing the disclosure risk associated with the data (DR), and the other representing the loss in the utility of the data, referred to as information loss (IL). The second step consists of defining a way to evaluate the different (DR, IL) combinations usually referred to as optimality criteria. Two existing optimality criteria are provided:

The first defines a threshold for DR, i.e., a maximum acceptable value for DR. For all k-anonymity methods, disclosure risk is defined by the k value. This stipulates a maximum probability of re-identification. Then within the space of solutions that satisfy the DR threshold, the optimal solution is defined to be the one with minimum IL.

The second defines a score combining the values of IL and DR, with the optimal solution being the one with the highest score. The most commonly used optimality criterion is the first one.

Four important requirements for de-identification are required to ensure that it is practical for use with clinical data sets. These requirements are not comprehensive, but represent a minimal necessary set.

Figure 1:
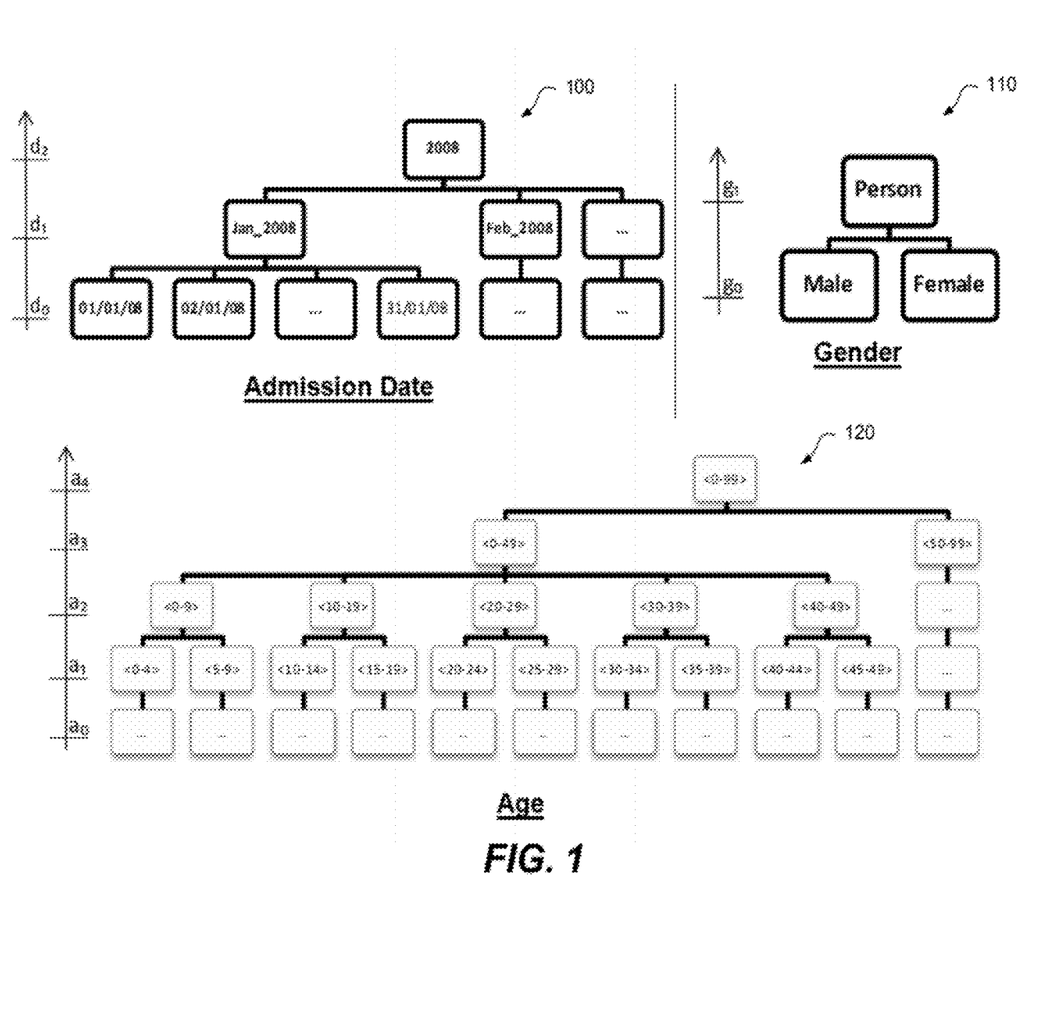
FIG. 1 shows representation of quasi-identifier discretization intervals.

Quasi-identifiers are represented as hierarchies—Quasi-identifiers in clinical data that is used for research, public health, quality improvement, and post-marketing surveillance purposes can be represented as hierarchies. This allows the precision of the variables to be reduced as one moves up the hierarchy. For example, a less precise representation of a postal or zip code "K1H 8L1" would be the first three characters only: "K1H". Similarly, a date of birth can be represented as a less precise year of birth as illustrated in FIG. 1. Therefore, a de-identification method needs to deal with this hierarchical nature of the variables.

Discretization intervals must be definable by the end-user—Some existing k-anonymity methods define a total order over all values of a given quasi-identifier, and a quasi-identifier can be recoded to any partition of the values that preserves the order. This means a k-anonymity method can automatically produce intervals of unequal sizes (for example, age may be partitioned to intervals such as <0-9><10-12><13-25><26-60>). The unequal interval sizes and the inability to control these in advance by the user (for example, by forcing it to have only five year intervals for age such as the example in FIG. 1) make the analysis of such data quite complex and reduces its utility significantly. In practice, the users of the data need to specify the interval sizes that are appropriate for the analysis that they will perform.

Use Global recoding instead of local recoding—A number of the k-anonymity methods use local recoding. This means that the generalizations performed on the quasi-identifiers are not consistent across all of the records. For example, if considering age, then one record may have a 17 year old recoded to an age interval of <11-19>, and another record with a 17 year old is recoded to the age interval of <16-22>. If the variable was hierarchical, then local recoding may keep one record with the age as 17, and the other record recoded to the <16-20> interval. Such inconsistency in constructing response categories makes the data very difficult to analyze in practice. Therefore, a more practical approach would be to use global recoding where all of the records have the same recoding within each variable.

The de-identification solution must be globally optimal—A globally optimal method achieves k-anonymity but at the same time minimizes information loss. Some k-anonymity solutions do work with hierarchical variables but they use heuristics or approximations to the optimal solution, and do not produce a globally optimal solution themselves. It is much preferable to have a globally optimal solution that can execute within a reasonable amount of time for large clinical data sets.

A common way to satisfy the k-anonymity requirement is to generalize and/or suppress values in the quasi-identifiers. Generalization means moving up the generalization hierarchy in quasi-identifier lattice as shown FIG. 2.

Figure 2:
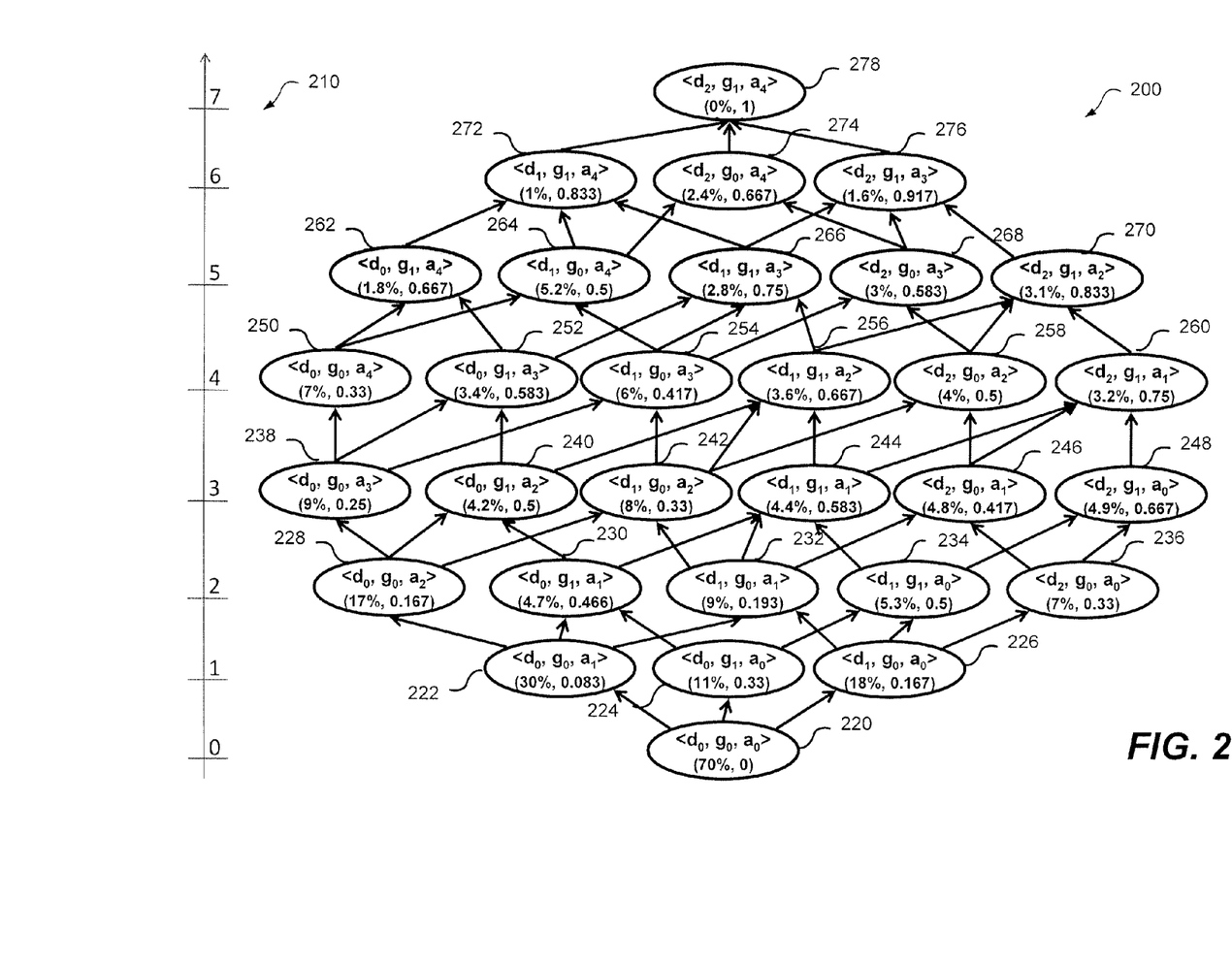
FIG. 2 shows presentation of a generalization hierarchy in quasi-identifier lattice.
Figure 3A:
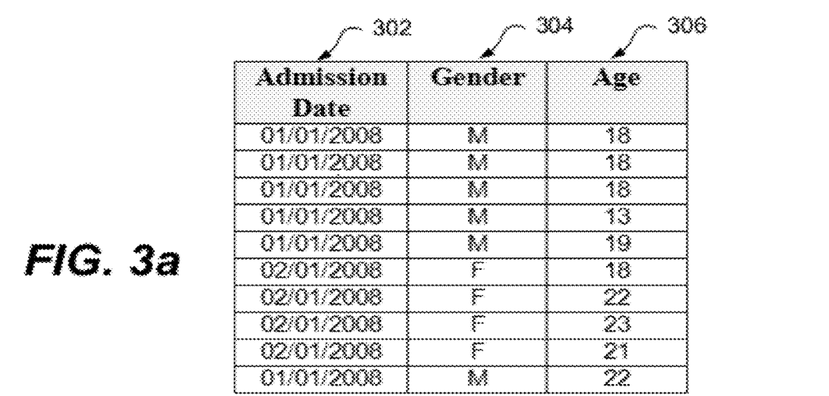
FIG. 3A shows a table defining admission date, gender and age data.
Figure 3B:
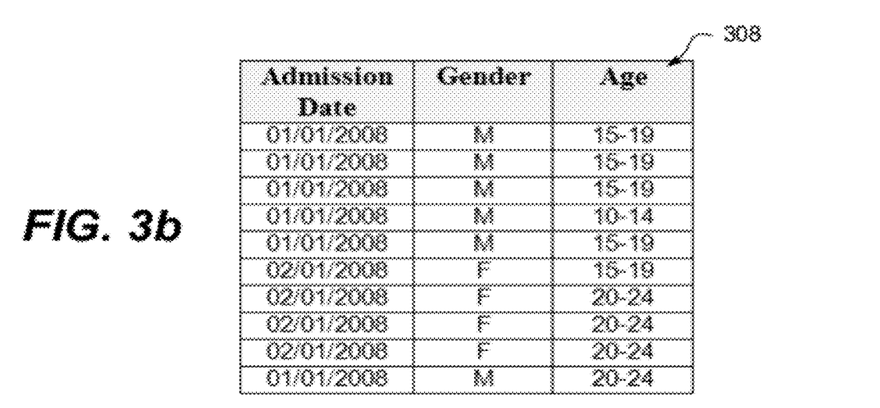
FIG. 3B shows the table of FIG. 3A where the age has been moved to discretization intervals.

The possible generalizations that can be applied to the quasi-identifiers form a lattice 200. The example lattice provides three quasi-identifiers is shown in FIG. 2. The height of each row 210 of nodes is shown on the left hand side, ranging from zero to 7 in this case. The arrows illustrate the possible generalization paths or generalization strategies that can be taken through the lattice. Each node in the lattice represents a possible instance of the data set. One of these nodes is the globally optimal solution and the objective of a k-anonymity method is to find it efficiently.

All equivalence classes that are smaller than k are suppressed. In FIG. 2, 70% of the records were suppressed in the data set represented by node <d0, g0, a0> 220 to achieve the desired k-anonymity where d0 corresponds to admission date generalization hierarchy 0 as shown in 100 of FIG. 1, g0 corresponds to gender generalization hierarchy 0 as shown in 110 and a0 corresponds to age generalization hierarchy 0 as shown in 120. As more generalization is applied, the extent of suppression goes down. For example, node <d0, g0, a1> 222, with age generalized to 5 year intervals, has only 30% of the records suppressed. Therefore, as any generalization strategy is traversed from the bottom to the top node, there is a monotonically decreasing level of suppression.

Suppression is preferable to generalization because the former affects single records whereas generalization affects all of the records in the data set. Therefore, when searching for an optimal solution, a solution that imposes more suppression would be selected instead of one that imposes more generalization.

However, because of the negative impact of missingness on the ability to perform meaningful data analysis, the end-users will want to impose limits on the amount of suppression that is allowed. This limit is referred to as MaxSup. It is assumed that the data analyst will specify MaxSup such that complete case analysis can be performed or imputation techniques can be used to compensate for the missing data.

It is assumed that MaxSup=5%, then the highlighted nodes in FIG. 2 represent all of the possible k-anonymous nodes since they would all satisfy the "suppression<5%" criterion. Once all of the k-anonymity solutions are determined, the one with the least information loss is selected from among them.

The extent of suppression is not a good measure of information loss because it has counter-intuitive behavior: as generalize occurs, suppression decreases (i.e., from a missingness perspective, data utility improves). Whereas information loss is intended to measure the reduction in the utility of the data as it is generalized. This is shown in the lattice of FIG. 2, whereby maximum generalization in node <d2, g1, a4> 278 has zero suppression and no generalization in node <d0, g0, a0> 220 has the highest level of suppression at 70% of the records.

Other measures of information loss must be considered to allow choices among the k-anonymous nodes.

Out of the highlighted nodes in the lattice, using known method the node with the lowest lattice height should be selected as the optimal solution. In the example, this would be node <d0, g1, a1> 230. The basic idea is that this solution balances the extent of generalization with the extent of suppression.

The lattice height is not considered a good information loss metric because it does not account for the generalization hierarchy depths of the quasi-identifiers. For example, if gender is generalized from "Male" to "Person" then this is given equal weight to generalizing age in years to age in five year intervals, as shown in FIG. 1 110. In the former case there is no information left in the gender variable, whereas the five year age interval 120 still conveys a considerable amount of information and there are three more possible generalizations left on age.

An information loss metric that takes into account the height of the generalization hierarchy is Precision or Prec. Prec is an information loss metric that is suitable for hierarchical, data. For every variable, the ratio of the number of generalization steps applied to the total number of possible generalization steps (total height of the generalization hierarchy) gives the amount of information loss for that particular variable. For example, if age is generalized from age in years to age in five year intervals, then the value is ¼. Total Prec information loss is the average of the Prec values across all quasi-identifiers in the data set. As a result, the more a variable is generalized, the higher the information loss. Moreover, variables with more generalization steps (i.e., more levels in their generalization hierarchy) tend to have less information loss than ones with shorter hierarchies. Using Prec as the information loss metric, the node <d2, g0, a1> 246 would be the optimal node rather than node <d0, g1, a1> 230 in FIG. 2.

Another commonly used information loss metric is the Discernability Metric or DM, the Discernability Metric assigns a penalty to every record that is proportional to the number of records that are indistinguishable from it. Following the same reasoning, DM assigns a penalty equal to the whole data set for every suppressed record (since suppressed records are indistinguishable from all other records). The DM metric is calculated as follows:

$$DM = \sum_{f_i \geq k} (f_i)^2 + \sum_{f_i < k} (n \times f_i)$$

where $f_i$ is the size of the equivalence class i, i=1 . . . Z where Z is the total number of equivalence classes in the data set, and n is the total number of records in the data set.

However, DM is not monotonic within a generalization strategy due to the impact of the second term incorporating suppression. The example in FIG. 2 shows two possible data sets for the <d0, g0, a0> 220 and <d0, g0, a1> 222, where the latter is a direct generalization of the former. We assume that we want to achieve 3-anonymity. For node <d0, g0, a0> 220, seven out of ten records do not achieve 3-anonymity, and therefore the DM value is 79. Whereas for node <d0, g0, a1> 222, the DM value is 55. This reduction in information loss as we generalize means that we would select the k-anonymity solution with the maximum generalization as the best one, which is counter-intuitive. It therefore makes sense not to include the suppression penalty in DM. In other words, a modified version of DM is used as follows:

$$DM^* = \sum_{i=1}^{Z} f_i^2.$$

The DM* value for table (a) in FIG. 3 is 16 and for table (b) it is 28.

Figure 4:
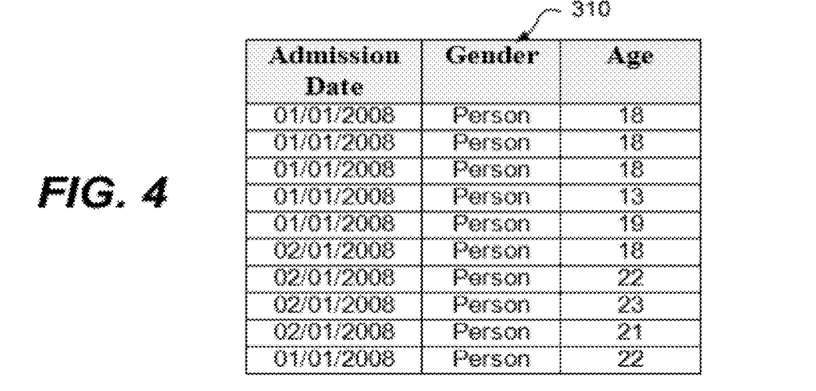
FIG. 4 shows the table of FIG. 3A where the gender has been generalized.

The DM* information loss also solves a weakness with the Prec metric in that Prec does not take into account the size of the equivalence classes. If gender 304 is generalized to "Person" in the table of FIG. 3a to obtain table as shown in FIG. 4, then the Prec for FIG. 4 would be 13 and DM* would be 16. However, table FIG. 3b has a Prec of 3 and a DM* of 28. As can be seen in this case, the higher Prec value had a lower DM* value. The reason is that the equivalence classes in FIG. 4 are larger than in FIG. 3b and Prec does not consider the structure of the data itself.

The concept behind DM has been criticized because DM does not measure how much the generalized records approximate the original records. For example, if a quasi-identifier such as age is used and six records have the following age values: 9, 11, 13, 40, 42, and 45, the minimal DM* value is when all of the records are grouped into three pairs: <9, 11>, <13, 40>, and <42, 45>. The criticism is that the second grouping has a very wide range and that a more sensible grouping would have only two equivalence classes: <9, 11, 13> and <40, 42, 45>. Since it is assumed that all data are hierarchical and that the end-user would specify the age grouping in the generalization hierarchy, the end-user may decide that the <13, 40> node in a value generalization hierarchy is acceptable. Therefore, this particular criticism is not applicable in the context that DM* is being utilized.

But the Discernability Metric has also been criticized because it does not give intuitive results when the distributions of the variables are non-uniform. For example, consider two different data sets with 1000 records. The first has 50 male records and 950 that are female, and the second has 500 males and 500 females. If gender is generalized to "Person", then intuitively the information loss for the 950 females in the first data set should be quite low and the female records dominate the data set. However, the DM* value indicates that the information loss for the non-uniformly distributed data set is much higher than for the uniformly distributed (second) data set (905,000 vs. 500,000). One information loss metric that has been proposed based on entropy has recently been extended to address the non-uniform distribution problem. Let $V_j$ be a quasi-identifier, with $1 \leq j \leq J$ and J is the total number of quasi-identifiers, and $V_j = \{a_1, \ldots, a_m\}$ where m is the total number of possible values that $V^j$ can take. For example, in table (a) in FIG. 3, if $V_j$ is the gender quasi-identifier, then m=2, and $a_1$="Male" and $a_2$="Female". When the data set is generalized the quasi-identifiers are denoted by $V_j'$ and $V_j' = \{b_1, \ldots, b_{m'}\}$ where m'≤m and each value in $V_j'$ is a subset of $V_j$. For example, in the gender case m'=1, and $a_1 \in b_1$ and $a_2 \in b_1$.

Let each cell in the original data set be denoted by $R_{ij}$ where $1 \leq i \leq n$ and the cells in the generalized data set denoted by $R_{ij}'$. The conditional probability that the value on a randomly selected record in the original data set is $a^r$ given that the new generalized value is $b_{r'}$ (where $a_r \in b_{r'}$) is given by:

$$Pr(a_r | b_{r'}) = \frac{\sum_{i=1}^{n} I(R_{ij} = a_r)}{\sum_{i=1}^{n} I(R_{ij}' = b_{r'})} \quad (1)$$

Where I(·) is the indicator function. The non-uniform entropy information loss is then given by:

$$-\sum_{i=1}^{n} \sum_{j=1}^{J} \log_2(Pr(R_{ij} | R_{ij}')) \quad (2)$$

Returning to our example, the 50/950 male/female distributed data set has an entropy of 286 whereas the 500/500 male/female distributed data set has an entropy of 1000. Therefore, the information loss in the former data sat is much lower, and this makes more intuitive sense.

The three information loss metrics presented above (Prec, DM*, and non-uniform entropy) are monotonic within any given generalization strategy. This means that as we move up the lattice along any generalization strategy the information loss value will either remain the same or increase.

This property is important because it means two k-anonymous nodes are provided in the same generalization strategy, the one lower in the strategy will always have a lower information loss. This property is utilized in the method described below.

While three information loss metrics have been presented that have the monotonicity property, this is not intended to be a comprehensive list. There may be other information loss metrics that also have this property.

In the method provided herein it is assumed that the dataset has more than k records. The de-identification method finds the optimal node in the lattice. The optimal node is k-anonymous and has minimal information loss. Information loss can be any one of the three metrics described above.

Figure 7:
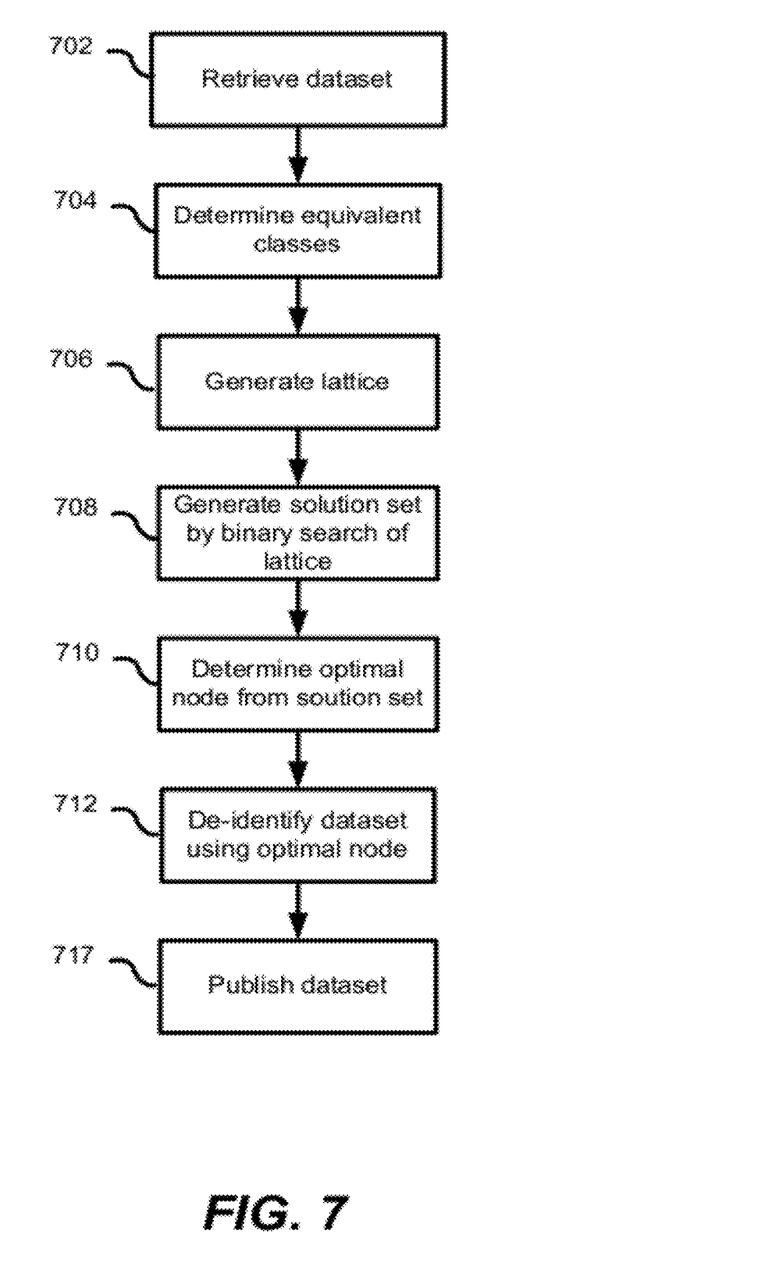
FIG. 7 shows a method of optimally de-identifying a dataset.

To find the optimal node, as shown in FIG. 7, the method commence with retrieving the dataset 702. The dataset may be stored externally or internally. The equivalence classes provided in the dataset are determined at 704 and a generalization hierarchy by user input. A primary lattice is then generated at 706 for example <d0, g0, a0> to <d2, g1, a4>. For each generalization strategy, all of the k-anonymous nodes based upon the provided dataset at 708 are determined by performing a recursive binary search utilizing sub-lattices. The binary search utilizes the left most middle node start from left to right. In generating the solution set, for each generalization strategy with k-anonymous nodes, only the k-anonymous node with the lowest height within the strategy is retained. For example, in FIG. 2 both nodes <d0,g1,a1> 226 and <d0,g1,a2> 230 are k-anonymous, but they are both part of the same generalization strategy and <d0,g1,a1> 226 has a lower height. This means that <d0,g1,a1> 226 will have less information loss on all of the three metrics considered. The node <d0,g1,a1> 226 is called a k-minimal node.

At 708, tagging of nodes is performed to take advantage of two properties of the lattice. First, if a node N is found to be k-anonymous then all nodes above N on the same generalization strategies that pass through N are also k-anonymous. Therefore all of these higher nodes are tagged instead of evaluating if they are k-anonymous. For example, if evaluating node <d0,g1,a2> 230 in FIG. 2 and determine that it is k-anonymous, then the following nodes can immediately be tagged as k-anonymous: <d0,g1,a3> 252, <d0,g1,a4> 262, <d1,g1,a4> 272, <d2,g1,a4> 278, <d1,g1,a2> 256, <d1,g1,a3> 266, <d2,g1,a3> 276, and <d2,g1,a2> 270. Second, if a node N is found not to be k-anonymous then all nodes below N on the same generalization strategies that pass through N are not k-anonymous. Therefore all of these lower nodes are tagged instead of evaluating if they are k-anonymous. For example, if evaluating node <d1,g0,a2> 242 in FIG. 2 and determine that it is not k-anonymous, then the following nodes can immediately be tagged as not k-anonymous: <d1,g0,a1> 232, <d0,g0,a2> 228, <d0,g0,a1> 222, <d1,g0,a0> 226, and <d0,g0,a0> 220.

Once the k-minimal nodes have been identified, these are compared at 710 in terms of their information loss and the node with the smallest information loss is selected as the globally optimal solution. Because of the monotonicity property, the k-minimal node with the smallest information loss must also have the smallest information loss among all k-anonymous nodes. The optimal generalization strategy found at 710 can then be applied to the dataset at 712 for de-identification for distribution or publication at 714.

To ensure efficiency the method minimizes the number of instances where it needs to determine if a node is k-anonymous by tagging many nodes as (not) k-anonymous instead of computing their k-anonymous status. It also minimizes the number nodes that need to be compared on information loss by only evaluating k-minimal solutions.

Figure 8:
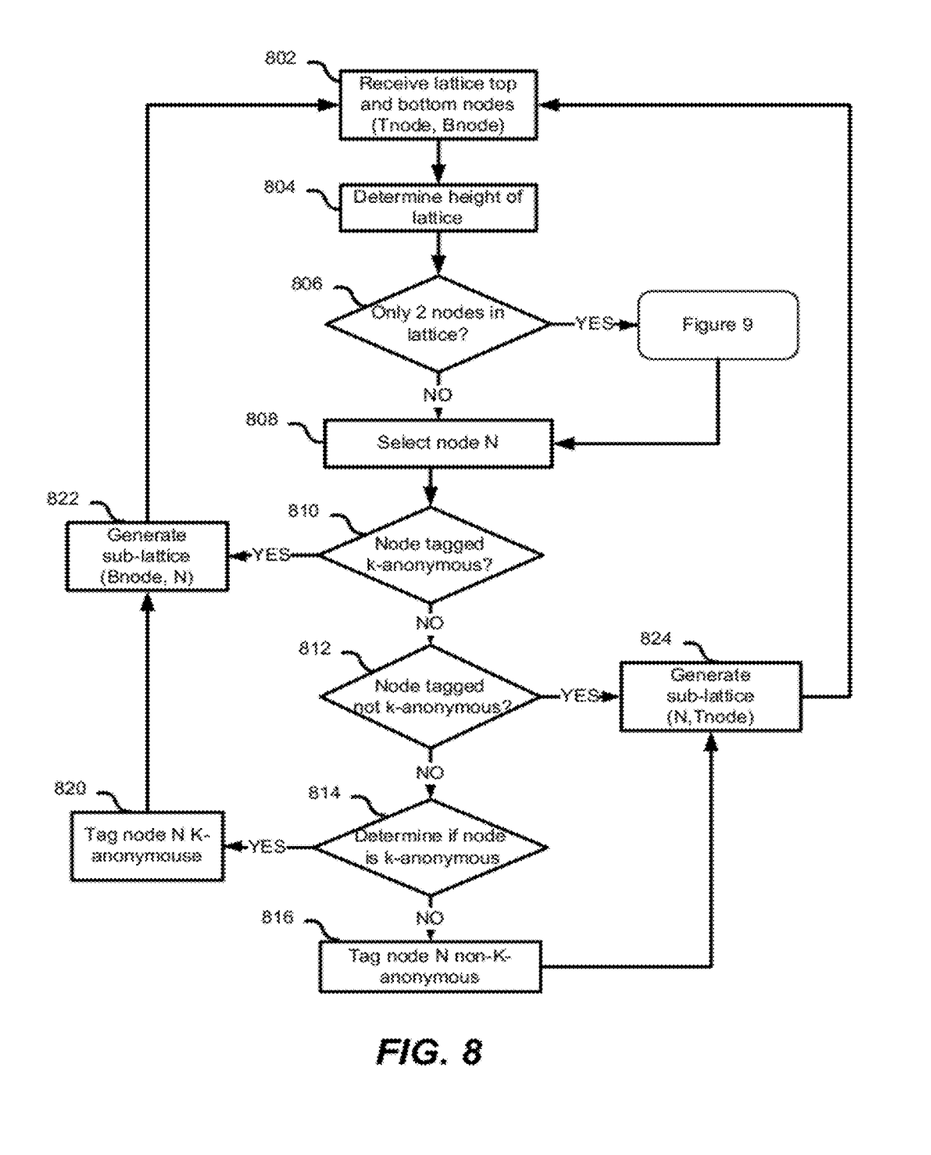
FIGS. 8 & 9 shows a method of performing a recursive binary search.
Figure 9:
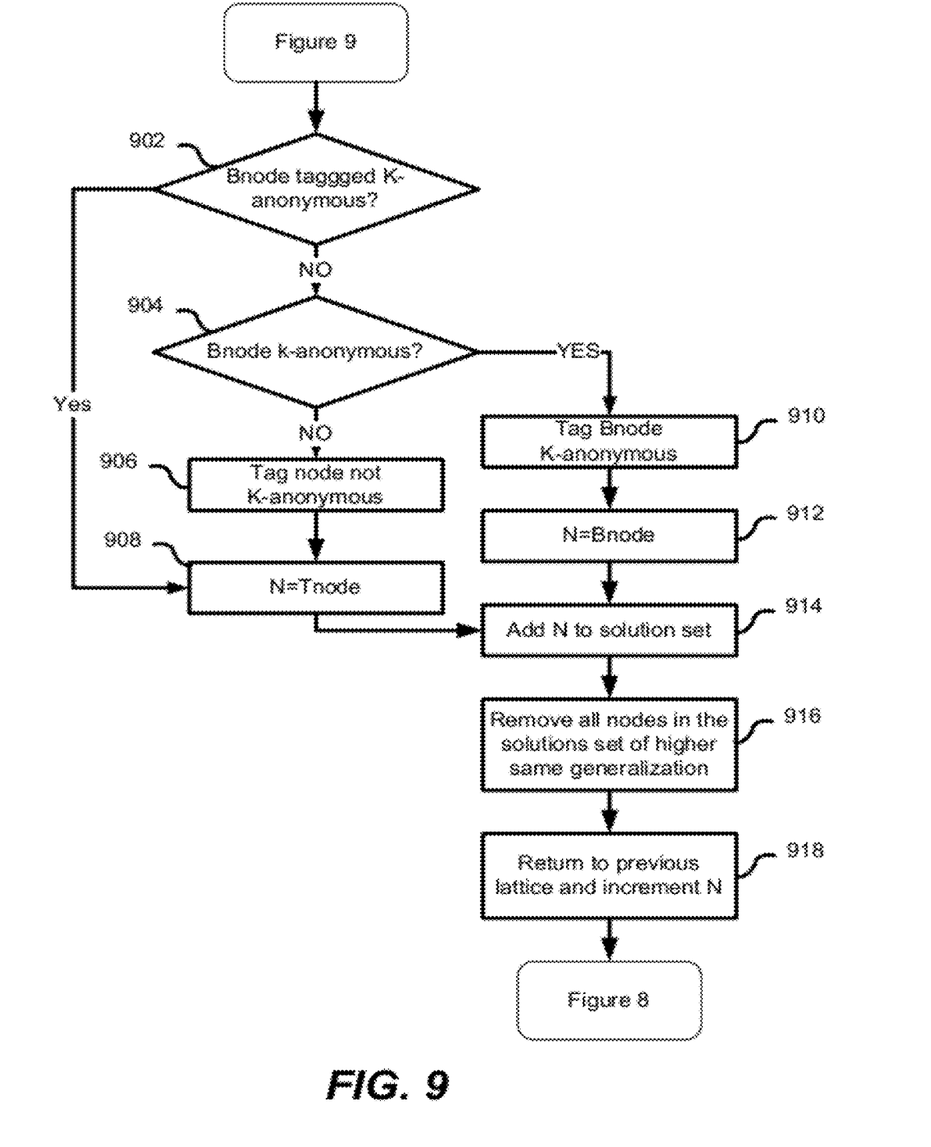

The recursive binary search through the generalization strategies in the lattice is described in connection with FIGS. 8 and 9 and pseudo code provided below. Referring to FIG. 8, to illustrate the method it starts the search for the globally optimal node by receiving the top and bottom node as the range for the search at 802. The lattice height is determined 804. If there are only two nodes in the lattice, YES at 806, the method continues as shown in FIG. 9. If the lattice is larger than two nodes, the middle point is determined at 808 of the lattice at the middle height (height equals 3) is the starting point, with the method iterating through the nodes starting from the left, although any direction would be suitable. When all the nodes at the middle height have been searched the method is completed. In the case of the sub-lattice the method continues search in the previous lattice while incrementing the next node to be searched. In this example the first node to be examined is <d0,g0,a3> 238. If the node has already been tagged k-anonymous, YES at 810, a sub-lattice is generated using the original bottom node (bnode) and the selected node N as the top node (tnode) of a new sub-lattice 822. If the node has not been tagged k-anonymous, NO at 810, it is then determined if the node has been tagged as not k-anonymous. If the node has been tagged not-k-anonymous, YES at 812, a sub-lattice is generated with node N as the bottom node (bnode) and the provided top node (tnode) in a sub-lattice for further searching 824.

The extent of suppression is computed at 814. If it is determined that the node is k-anonymous, YES at 814, the node is tagged at 820 and all other higher nodes in the lattice along the same generalization strategies that pass through the node will also tag as k-anonymous. A sub-lattice is generated at 822 using bnode and N. If it is determined that this is not a k-anonymous, NO at 814, the node and is tagged as such at 816 all other lower nodes in the lattice along the same generalization strategies that pass through the node will also tag as not k-anonymous. A sub-lattice is generated at 824 using N and tnodes. In this example all nodes below <d0,g0,a3> 238 on all generalization strategies that go through node <d0,g0,a3> 238 are also by definition not k-anonymous nodes: nodes <d0,g0,a0> 220, <d0,g0,a1> 222, and <d0,g0,a2> 228 can be tagged as not k-anonymous right away without further computation as will be performed at 916 of FIG. 9.

The sub-lattice as would be generated at 824, whose bottom node is <d0,g0,a3> 238 and top node is <d2,g1,a4> 278 is then analyzed. This sub-lattice is illustrated in panel (a) of FIG. 5. The same process as above are repeated. The middle height in this sub-lattice is selected, which is node <d0,g1,a4> 262. The extent of suppression is computed for this node, it is determined that this node is k-anonymous, and it is tagged as such. This also means that all other nodes above <d0,g1,a4> 262 on all generalization strategies that go through node <d0,g1,a4> 262 are k-anonymous and can be tagged as such. In this case these are nodes <d1,g1,a4> 272 and <d2,g1,a4> 278.

The sub-lattice whose top node is <d0,g1,a4> 262 and bottom node is <d0,g0,a3> 238 is then selected. This sub-lattice is illustrated in panel (b) of FIG. 5. The same process as above are repeated. The middle height in this sub-lattice is selected, which is node <d0,g0,a4> 250. The extent of suppression is computed for this node, and it is determined that this node is not k-anonymous. This also means that all other nodes below <d0,g0,a4> 250 on all generalization strategies that go through node <d0,g0,a4> 250 are also by definition not k-anonymous. In this case the nodes below it are: <d0,g0,a3> 238, <d0,g0,a2> 228, <d0,g0,a1> 222, and <d0,g0,a0> 220.

The next node is then selected in the most recent sub-lattice, which is node <d0,g1,a3> 252 and determine that it is k-anonymous and it is tagged as such. But it can also be determined that all other nodes above <d0,g1,a3> 252 on all generalization strategies that go through node <d0,g1,a3> 252 are also by definition k-anonymous solutions and can be tagged. In this case these are nodes <d0,g1,a4> 262, <d1,g1,a3> 266, <d1,g1,a4> 272, <d2,g1,a3> 276, and <d2,g1,a4> 278.

Figure 5:
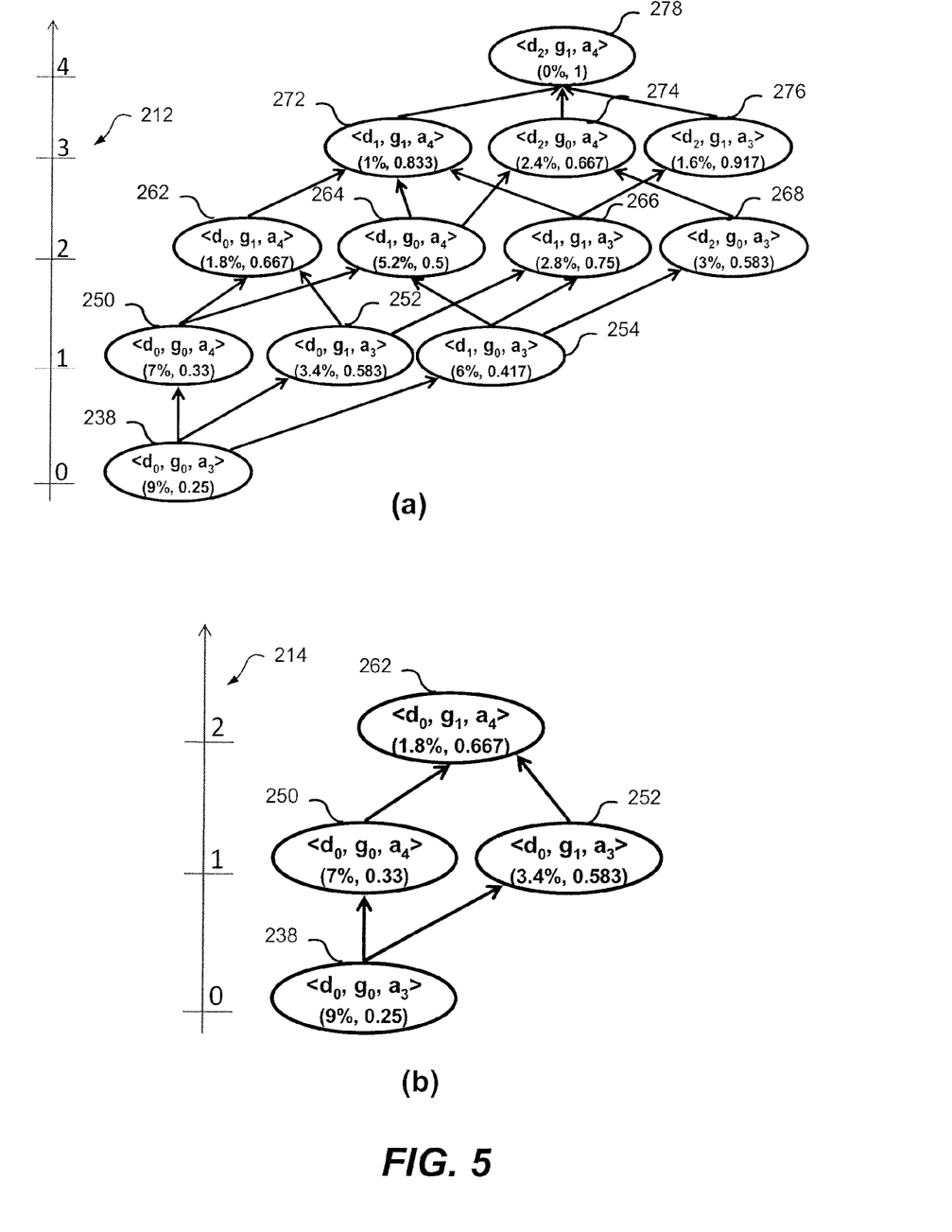
FIG. 5A shows a first sub-lattice of in quasi-identifier lattice in FIG. 2.
FIG. 5B shows a second sub-lattice of in quasi-identifier lattice in FIG. 4.
Figure 6:
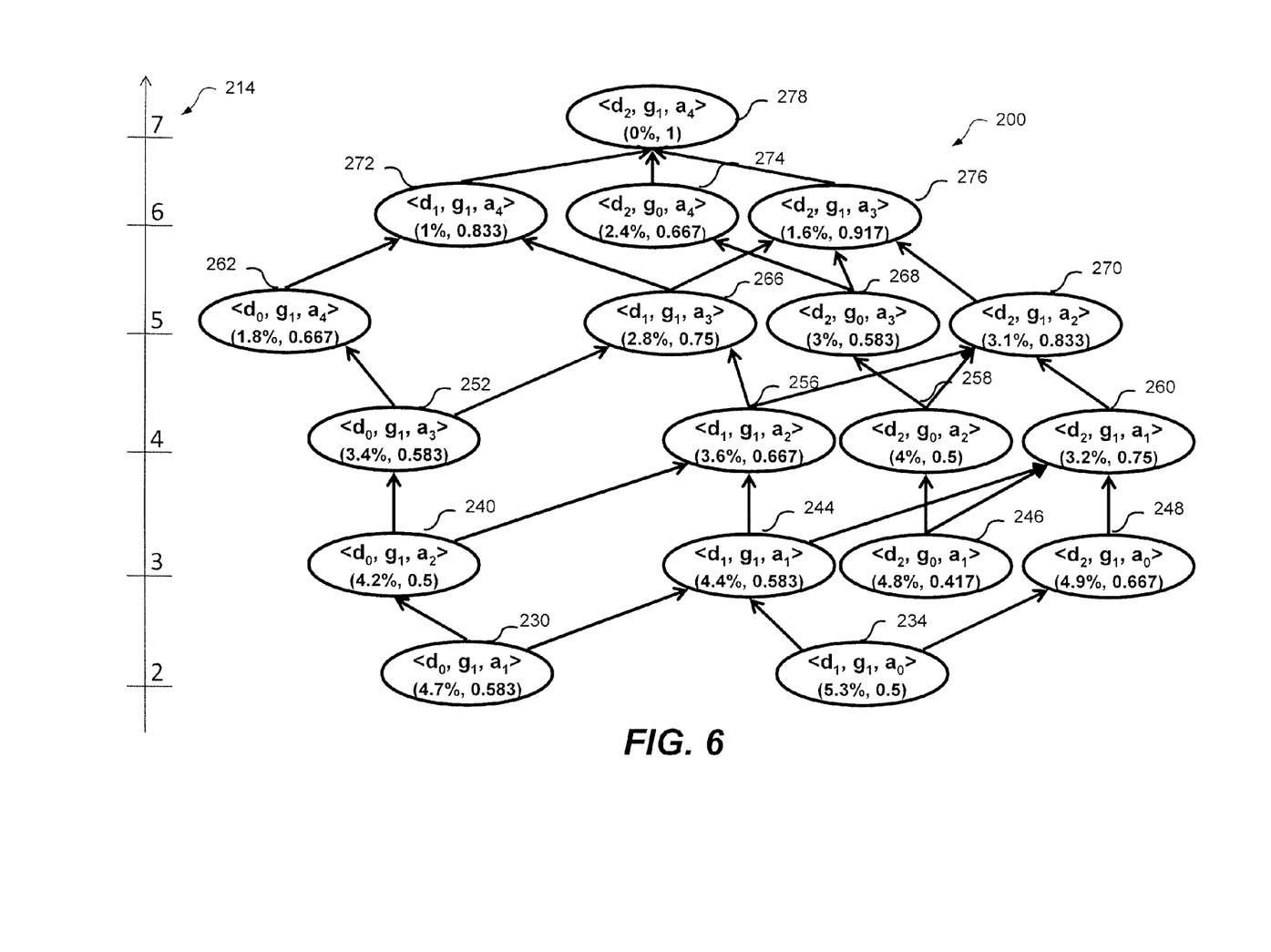
FIG. 6 shows an age generalization hierarchy of the quasi-identifier lattice of FIG. 2.

Returning to the sub-lattice in panel (a) of FIG. 5 and evaluate node <d1,g0,a4> 264. The suppression is higher than 5% and it is therefore not k-anonymous, and it is tagged as such. It is then determined that all other nodes below <d1,g0,a4> 264 on all generalization strategies that go through node <d1,g0,a4> 264 are also by definition not k-minimal solutions and are tagged as such. In this case these are nodes: <d1,g0,a3> 254, <d0,g0,a3> 238, <d1,g0,a2> 242, <d0,g0,a2> 228, <d1,g0,a1> 232, <d0,g0,a4> 250, <d0,g0,a1> 222, <d1,g0,a0> 226, and <d0,g0,a0> 220.

When a two node lattice occurs, YES at 806, a modified method is performed at per FIG. 9. As the lattice only consists of two nodes, a bnode and a tnode, if the bnode is tagged not k-anonymous, YES at 902, the tnode is selected at 908 and added to the solution set at 914. If not tagged, NO at 902, the extent of suppression is computed at 904. If the bnode does not meet the criteria for k-anonymity, NO at 904, the node is tagged not K-anonymous at 906 and tnode is is selected at 908 and added to the solution set at 914. If bnode is k-anonymous, YES at 904, bnode is tagged k-anonymous at 910, and selected at 912 to be added to the solution set at 914. Continuing from 914, all nodes that are in the solution set that are higher or on the same generalization strategy can be removed while maintaining the nodes lowest in the hierarchy at 916. The method then returns to the previous lattice 918 and continues the search the search with an next node as described in FIG. 8.

This search process tags a significant percentage of the nodes without evaluating them. The method also maintains a k-minimal solutions list of the k-anonymous nodes that have the lowest height within their generalization strategies. Whenever a node N is tagged as k-anonymous the method checks if there are other k-anonymous nodes above it on the generalization strategies that pass through N. If there are, then these higher nodes are removed from the k-minimal solutions list and node N is added to the list.

The method then compares the nodes in the k-minimal solutions list on information loss and select the one with the smallest value as the globally optimal solution. The following pseudo code in connection with FIGS. 8 and 9 is used to describe the binary recursive search method for the optimal de-identification. The method below is started by creating the top and bottom nodes of the main lattice.

```
Kmin(Bnode,Tnode)
{
    L=Lattice(Bnode,Tnode)
    H_H=Height(L,Tnode)
    If H_H > 1 then
```

$$h = \left\lfloor \frac{H_H}{2} \right\rfloor$$

```
        For p=1 to Width(L, h)
            N = Node(L,h,p)
            If IsTaggedKAnonymous(N) == True then
                Kmin(Bnode, N)
            Else if IsTaggedNotKAnonymous(N) == True then
                Kmin(N,Tnode)
            Else if IsKAnonymous(N) == True then
                TagKAnonymous(N)
                KMin(Bnode,N)
            Else
                TagNotKAnonymous(N)
                KMin(N,Tnode)
            End If
        End For
    Else
        // this is a special case of a two node lattice
        if IsTaggedNotKAnonymous(Bnode) == True then
            N = Tnode
        Else if IsKAnonymous(Bnode) == True then
            TagKAnonymous(Bnode)
            N = Bnode
        Else
            TagNotKAnonymous(Bnode)
            N = Tnode
        End If
        S= S + N
        CleanUp(N)
    End if
Main
Main
    S= { }
    KMin(Bottom-Node, Top-Node)
```

$$\text{Optimal} = \min_{x \in S}(\text{InfoLoss}(x))$$

```
End Main
```

| Function | Description |
| --- | --- |
| InfoLoss(node) | Computes the information loss for a particular node in the lattice. The particular information loss metric maybe Prec, DM*, non-uniform entropy, or any other metric that satisfies the monotonicity property. |
| IsKAnonymous(node) | Determines whether the node is k-anonymous. This is the most time consuming function in the algorithm. |
| IsTaggedKAnonymous(node) | Determines whether a particular node has already been tagged as k-anonymous. Returns True or False. |
| IsTaggedNotKAnonymous(node) | Determines whether a particular node has already been tagged as not k-anonymous. Returns True or False. |
| TagKAnonymous(node) | Tag a particular node as k-anonymous. This will also tag as k-anonymous all other higher nodes in the lattice along the same generalization strategies that pass through the node. |
| TagNotKAnonymous(node) | Tag a particular node as not k-anonymous. This will also tag as not k-anonymous all other lower nodes in the lattice along the same generalization strategies that pass through the node. |
| Node(lattice,height,index) | This function is used to navigate a lattice. It returns the node at index in a particular height. The index values start from the left. |
| Lattice(bottom-node, top-node) | Creates a lattice with a particular node at the bottom and another at the top. |
| Height(lattice, node) | This function returns the height of a particular node in the particular (sub-) lattice. |
| Width(lattice, height) | Returns the number of nodes at a particular height in the lattice. This is used mainly to traverse a level in a lattice. |
| CleanUp(node) | Removes all nodes in the solutions set that are generalizations of node (i.e., on the same generalization strategies). |

In principle, the number of records flagged for suppression after the application of our method can be as high as the suppression limit provided by the users of the method (Max-Sup). However, this does not necessarily mean that these whole records need to be suppressed. A local cell suppression method can be applied to the flagged records and it will only suppress specific values of the quasi-identifiers on the flagged records. Such an approach ensures that the number of cells suppressed from the set of flagged records are close to the optimal.

A recipient of a data set may wish to impose constraints on the generalization that is performed. Some common constants can be accommodated with the method by limiting the nodes that are included in the lattice. Two specific examples are considered below.

A recipient may want to impose a maximum allowable generalization. For example, a researcher may say that any generalization of age above a 5 year interval is unacceptable. If we take the age generalization hierarchy in shown in FIG. 6, then a1 would be the highest acceptable height. Such a constraint can be accommodated by creating a lattice where the top node is <d2,g1,a1> 260 instead of <d2,g1,a4> 278. This ensures that the globally optimal solution will never have an age generalization above 5 years.

Another constraint that is often useful to have is to correlate the generalizations among multiple quasi-identifiers. For example, if a data set has a date of death and an autopsy date as quasi-identifiers, it would not make sense to generalize the former to the nearest year, and keep the month and year for the latter. In such a case an intruder would be able to infer the month of death quite accurately by knowing the month of the autopsy. Therefore, the additional level of generalization on date of death provides no protection. We therefore want to make sure that the generalizations performed on both of these variables match. This can be achieved by not having any nodes in the lattice where these two variables have different levels of generalization.

Instead of generalization and suppression, other de-identification approaches could be used, such as the addition of noise. It has been argued that while these approaches may maintain the aggregate properties of the data (such as the mean), they do not preserve the truthfulness of individual records. Furthermore, the optimal type of disturbance will depend on the desired analysis that will be done with the data, which makes it difficult to de-identify data sets for general use.

Figure 10:
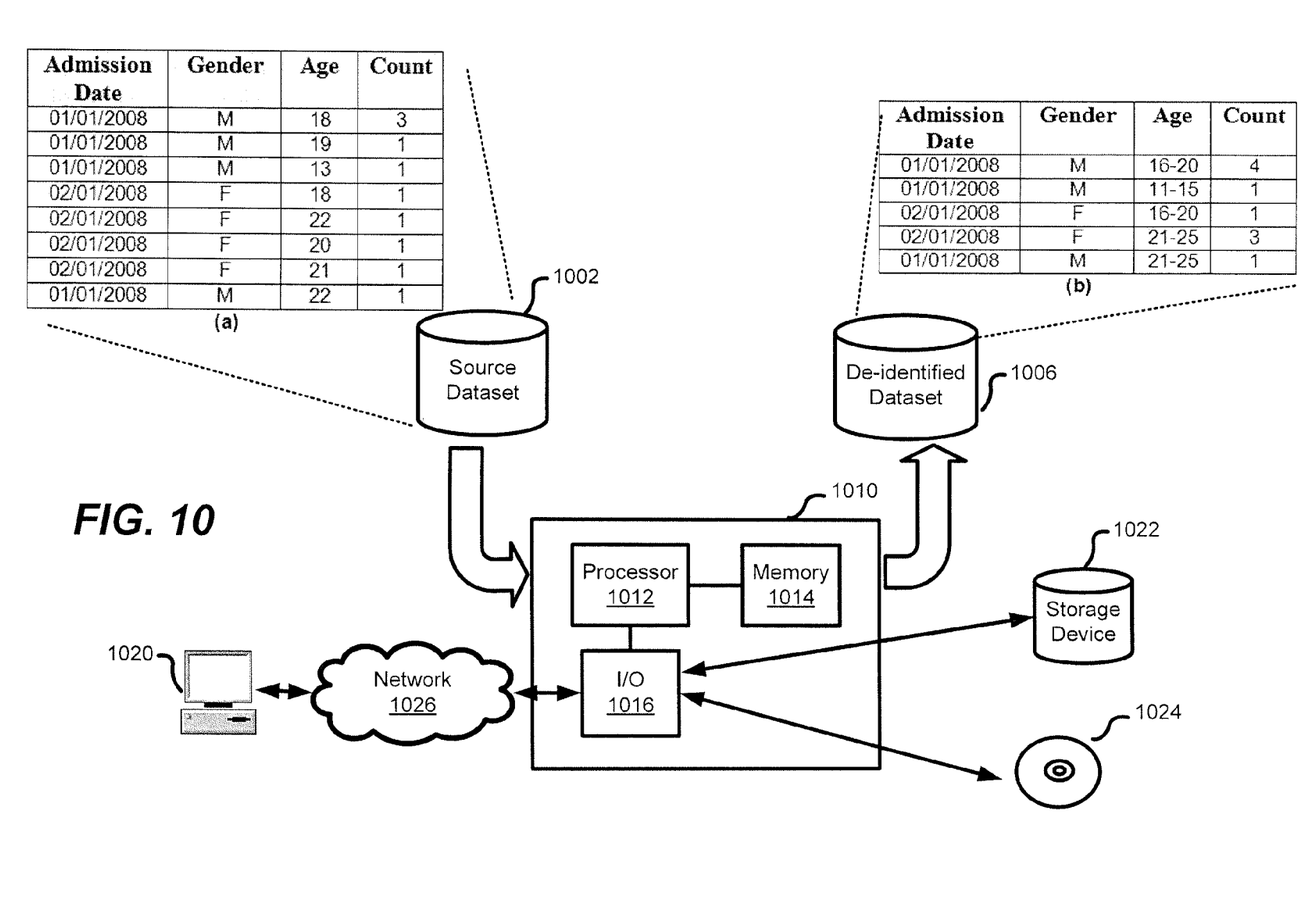
FIG. 10 shows system for optimizing de-identifying of a dataset.

FIG. 10 provides a system for optimal de-identification as used in connection with the above described method. A computer or server 1010 providing at least a processor 1012, memory 1014 and input/output interface 1016, implements the code for executing the de-identification process. A source dataset 1002 is stored on computer readable storage memory which may reside locally or remotely from processing unit 1010. The dataset is processed by the computer 1010 to provide the optimal de-identification quasi-identifiers based in put provided identifying the level of k-anonymity and suppression suitable to the dataset. Generalization strategies and levels of suppression can also be provided through template files, user selection or input through interaction with the computer 1010, either directly through input devices such as a keyboard/mouse or remotely through a connected computing network 1026. External storage 1022, or computer readable memory such as compact disc, digital versatile disc or other removable memory devices 1024 may be used to provide the instructions for execution of the de-identification method or provide input for generalization or suppression parameters via I/O unit 1016. Execution of the method on processor 1012 generates a de-identified dataset 1006 or provide the resulting parameters to generate the dataset by other computing means.

The invention claimed is:

1. A method of de-identifying a dataset containing personal data records to minimize data loss on a computing device comprising a memory and a processor, the processor performing the method comprising:
   retrieving the dataset from a storage device;
   determining equivalence classes for one or more quasi-identifiers defined within the dataset, the equivalence classes based upon ranges of values associated with each quasi-identifier;
   generating a lattice comprising a plurality of nodes, each node of the lattice defining an anonymization strategy by equivalence class generalization of one or more quasi-identifiers and an associated record suppression value, the plurality of nodes in the lattice arranged in rows providing monotonically decreasing level of suppression from a bottom of the lattice to a top of the lattice;
   generating a solution set for one or more generalization strategies for the plurality of nodes of the lattice providing k-anonymity, by performing a recursive binary search of the lattice commencing from a left most node in a middle row of the lattice, each of the one or more generalization strategies being defined by nodes lowest in the respective generalization strategy within the lattice, each providing a least amount of equivalence class generalization of one or more quasi-identifiers and the associated record suppression value of the dataset; and
   determining one or more optimal nodes from the solution set the one or more optimal nodes lowest in height in the one or more generalization strategies, the one or more optimal nodes providing the least amount of generalization and suppression within the solution set of one or more records of the dataset, the optimal nodes determined to provide minimal information loss using a non-uniform entropy metric.

2. The method of claim 1 further comprising:
   de-identifying the dataset using the equivalence class generalization defined by the optimal node; and
   storing the de-identified dataset.

3. The method of claim 1 wherein generating the solution set further comprises:
   determining a top lattice node (Tnode) and a bottom lattice node (Bnode);
   determining a height of the lattice (Tnode, Bnode);
   selecting a middle point node of the lattice (Nnode) based upon the height of the lattice;
   generating one or more sub-lattices from (Tnode, Bnode); and
   determining for each of the one or more sub-lattices if k-anonymity is provided by one or more nodes in the sub-lattice based upon the anonymization strategies defined for the node.

4. The method of claim 3 wherein determining for each of the one or more sub-lattices determining if k-anonymity is provided further comprises:
   determining if Nnode of the lattice (Tnode, Bnode) is identified k-anonymous generating a sub-lattice using the Bnode and Nnode (Bnode,Nnode);
   determining if Nnode of the lattice (Tnode, Bnode) is identified as not k-anonymous generating a sub-lattice using the Nnode and Tnode (Nnode, Tnode).

5. The method of claim 4 wherein determining for each of the one or more sub-lattices further comprises determining if k-anonymity of the node based upon the associated generalization strategy wherein if k-anonymity of the Nnode has not been determined:
  determining Nnode is k-anonymous using the defined anonymization strategy by equivalence class generalization of one or more quasi-identifiers;
  identifying the node as k-anonymous when the dataset has the property that each record is similar to at least another k−1 other records on the potentially identifying variables;
  identifying the node as not k-anonymous when dataset has the property that each record has unique records that are not similar to any other records in the dataset.

6. The method of claim 5, wherein when determining the middle of lattice, if only two nodes are in the lattice, the method further comprising:
  determining if Bnode is identified as k-anonymous;
  defining Bnode as equal to Tnode;
  adding the Bnode to the solution set.

7. The method of claim 6 further comprising:
  determine if the Bnode is k-anonymous;
  wherein if Bnode is k-anonymous identifying the Bnode as k-anonymous and defining Nnode as the equal to Bnode;
  wherein if Bnode is not k-anonymous, identifying the Bnode as not K-anonymous and defining Nnode as equal to Tnode;
  adding Nnode to the solution set; and
  removing all nodes the solution set of higher than or of same generalization as Nnode.

8. The method of claim 7 further comprising:
  returning to the previous sub-lattice; and
  increment Nnode to a next node in the lattice.

9. The method of claim 1 where in determining one or more optimal nodes from the solution set providing the least amount of generalization and suppression of one or more records of the dataset is performed based upon a defined identification risk threshold, the risk threshold associated with re-identification of one or more records in the dataset with an associated individual.

10. The method of claim 1 wherein the quasi-identifiers are selected from the group comprising: dates; age; birth date; location data; postal address; gender; profession; ethnic origin; languages spoke; and income.

11. A system for optimally de-identifying a dataset, the system comprising:
  a memory for storing instructions;
  a storage device for storing the dataset; and
  a processor for executing instructions to perform:
    retrieving the dataset from the storage device;
    determining equivalence classes for one or more quasi-identifiers defined within the dataset, the equivalence classes based upon ranges of values associated with each quasi-identifier;
    generating a lattice comprising a plurality of nodes, each node of the lattice defining an anonymization strategy by equivalence class generalization of one or more quasi-identifiers and an associated record suppression value the plurality of nodes in the lattice arranged in rows providing monotonically decreasing level of suppression from a bottom of the lattice to a top of the lattice;
    generating a solution set for one or more generalization strategies for the plurality of nodes of the lattice providing k-anonymity, by performing a recursive binary search of the lattice commencing from a left most node in a middle row of the lattice, each of the one or more generalization strategies being defined by nodes lowest in the respective generalization strategy within the lattice, each providing a least amount of equivalence class generalization of one or more quasi-identifiers and the associated record suppression value of the dataset; and
    determining one or more optimal nodes from the solution set the one or more optimal nodes lowest in height in the one or more generalization strategies, the one or more optimal nodes providing least amount of generalization and suppression within the solution set of one or more records of the dataset, the optimal nodes determined to provide minimal information loss using a non-uniform entropy metric.

12. The system of claim 11 further comprising:
  de-identifying the dataset using the equivalence class generalization defined by the optimal node; and
  storing the de-identified dataset.

13. The system of claim 11 wherein the generating solution set further comprises:
  determining a top lattice node (Tnode) and a bottom lattice node (Bnode);
  determining a height of the lattice (Tnode, Bnode);
  selecting a middle point node of the lattice (Nnode) based upon the height of the lattice;
  generating one or more sub-lattices from (Tnode, Bnode); and
  determining for each of the one or more sub-lattices if k-anonymity is provided by one or more nodes in the sub-lattice based upon the anonymization strategies defined for the node.

14. The system of claim 13 wherein determining for each of the one or more sub-lattices determining if k-anonymity is provided further comprises:
  determining if Nnode of the lattice (Tnode, Bnode) is identified k-anonymous generating a sub-lattice using the Bnode and Nnode (Bnode,Nnode);
  determining if Nnode of the lattice (Tnode, Bnode) is identified as not k-anonymous generating a sub-lattice using the Nnode and Tnode (Nnode, Tnode).

15. The system of claim 14 wherein determining for each of the one or more sub-lattices further comprises determining if k-anonymity of the note based upon the associated generalization strategy wherein if k-anonymity of the Nnode has not been determined:
  determining Nnode is k-anonymous using the defined anonymization strategy by equivalence class generalization of one or more quasi-identifiers;
  identifying the node as k-anonymous when the dataset has the property that each record is similar to at least another k−1 other records on the potentially identifying variables;
  identifying the node as not k-anonymous when dataset has the property that each record has unique records that are not similar to any other records in the dataset.

16. The system of claim 15 wherein when determining the middle of lattice, if only two nodes are in the lattice, the method further comprising:
  determining if Bnode is identified as k-anonymous;
  defining Bnode as equal to Tnode;
  adding the Bnode to the solution set.

17. The system of claim 16 further comprising:
  determine if the Bnode is k-anonymous;
  wherein if Bnode is k-anonymous identifying the Bnode as k-anonymous and defining Nnode as the equal to Bnode;
  wherein if Bnode is not k-anonymous, identifying the Bnode as not K-anonymous and defining Nnode as equal to Tnode;

adding Nnode to the solution set; and
removing all nodes the solution set of higher than or of same generalization as Nnode.

18. The system of claim 17 further comprising:
returning to the previous sub-lattice; and
increment Nnode to a next node in the lattice.

19. The system of claim 11 where in determining one or more optimal nodes from the solution set providing the least amount of generalization and suppression of one or more records of the dataset is performed based upon a defined identification risk threshold, the risk threshold associated with re-identification of one or more records in the dataset with an associated individual.

20. The system of claim 11 wherein the quasi-identifiers are selected from the group comprising: dates; age; birth date; location data; postal address; gender; profession; ethnic origin; languages spoke; and income.

* * * * *